US010938710B2

(12) United States Patent
Huang et al.

(10) Patent No.: US 10,938,710 B2
(45) Date of Patent: Mar. 2, 2021

(54) PROTECTION SWITCHING METHOD AND SYSTEM, AND NETWORK DEVICE

(71) Applicant: HUAWEI TECHNOLOGIES CO., LTD., Shenzhen (CN)

(72) Inventors: Jing Huang, Shenzhen (CN); Min Zha, Shenzhen (CN); Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/429,056

(22) Filed: Jun. 2, 2019

(65) Prior Publication Data

US 2019/0288936 A1    Sep. 19, 2019

Related U.S. Application Data

(63) Continuation of application No. PCT/CN2017/102522, filed on Sep. 20, 2017.

(30) Foreign Application Priority Data

Dec. 2, 2016  (CN) .......................... 201611096716.1

(51) Int. Cl.
*H04L 12/26* (2006.01)
*H04L 12/707* (2013.01)
(Continued)

(52) U.S. Cl.
CPC ............ *H04L 45/22* (2013.01); *H04L 12/437* (2013.01); *H04L 45/245* (2013.01); *H04L 45/28* (2013.01); *H04L 43/0882* (2013.01)

(58) Field of Classification Search
CPC ..... H04L 12/707; H04L 12/703; H04L 45/22; H04L 43/0882; H04L 45/28
See application file for complete search history.

(56) References Cited

U.S. PATENT DOCUMENTS

2004/0190444 A1 * 9/2004 Trudel .................... H04J 3/085
                                                        370/224
2004/0193724 A1 * 9/2004 Dziong ................ H04L 47/746
                                                        709/232
(Continued)

FOREIGN PATENT DOCUMENTS

CN         100348532 C      11/2007
CN         101621448 A       1/2010
(Continued)

OTHER PUBLICATIONS

"ITU-T G.808.1 : Generic protection switching—Linear trail and subnetwork protection", May 31, 2014, XP055609132, total 74 pages.

(Continued)

*Primary Examiner* — Chi Ho A Lee
(74) *Attorney, Agent, or Firm* — Kilpatrick Townsend & Stockton LLP

(57) ABSTRACT

Embodiments provide a protection switching method and system, a network device, and related communications technologies. In various embodiments, if n links carrying a client service are unavailable in a FlexE link group, at least one protection link can be selected, by a first network device, from links other than the n links in the FlexE link group. A calendar request can be sent, by the first network device, to a second network device over the protection link. A calendar acknowledge can be sent by the second network device over the protection link and can be received, by the first network device. A transmission of the client service can be switched over from the n links to the protection link. In the present invention, an application requirement of the FlexE for protection switching is satisfied.

18 Claims, 9 Drawing Sheets

(51) Int. Cl.
*H04L 12/703* (2013.01)
*H04L 12/709* (2013.01)
*H04L 12/437* (2006.01)

(56) References Cited

U.S. PATENT DOCUMENTS

| | | | | |
|---|---|---|---|---|
| 2007/0036073 A1* | 2/2007 | Yamada | ................... | H04L 69/40 370/225 |
| 2014/0301192 A1* | 10/2014 | Lee | ................. | H04L 45/02 370/230 |
| 2015/0188625 A1* | 7/2015 | Park | ................... | H04B 10/27 398/2 |
| 2015/0288600 A1 | 10/2015 | Xie et al. | | |
| 2016/0119076 A1 | 4/2016 | Gareau | | |
| 2016/0149752 A1* | 5/2016 | Belanger | ............. | H04L 41/0659 370/216 |
| 2017/0005742 A1* | 1/2017 | Gareau | ................ | H04J 3/1658 |
| 2018/0013511 A1* | 1/2018 | Hussain | ............ | H04J 14/0205 |
| 2018/0102834 A1* | 4/2018 | Ibach | ................... | H04J 3/1652 |

FOREIGN PATENT DOCUMENTS

| | | |
|---|---|---|
| CN | 102833089 A | 12/2012 |
| CN | 103052106 A | 4/2013 |
| CN | 106911426 A | 6/2017 |
| EP | 2352253 A1 | 8/2011 |
| EP | 2661048 A1 | 11/2013 |
| EP | 2627039 B1 | 6/2016 |
| WO | 2012171397 A1 | 12/2012 |

OTHER PUBLICATIONS

ITU G.873.1, Series G: Transmission Systems and Media, Digital Systems and networks, Digital Networks—Optical transport networks, Optical Transport Network (OTN): Linear protection Amendment 1: New Appendix III—Optical layer protection (Dec. 2014). total 10 pages.

ITU-T G.8031/Y.1342, Series G: Transmission Systems and Media, Digital Systems and Networks, Packet over Transport aspects—Ethernet over Transport aspectsSeries Y: Global Information Infrastructure, Internet Protocol Aspects and Next-Generation Networks, Internet protocol aspects—Transport, Ethernet linear protection switching, (Jan. 2015), total 96 pages.

ITU-T G.8131/Y.1382, Series G: Transmission Systems and Media, Digital Systems and Networks Packet over Transport aspects—MPLS over Transport aspectsSeries Y: Global Information Infrastructure, Internet Protocol Aspects and Next-Generation Networks, Internet of Things and Smart CitiesInternet protocol aspects—Transport. Linear protection switching for MPLS transport profile, Amendment 2, Nov. 2016. total 38 pages.

J. Ryoo, Ed et al.:MPLS Transport Profile (MPLS-TP) Linear Protection to Match the Operational Expectations of Synchronous Digital Hierarchy, Optical Transport Network, and Ethernet Transport Network Operators, RFC7271. Jun. 2014. total 40 pages.

Y. Weingarten, Ed. et al. MPLS Transport Profile (MPLS-TP) Linear Protection, RFC6378, Oct. 2011, total 11 pages.

* cited by examiner

PROTECTION SWITCHING METHOD AND SYSTEM, AND NETWORK DEVICE

CROSS-REFERENCE TO RELATED APPLICATIONS

This application is a continuation of International Application No. PCT/CN2017/102522, filed on Sep. 20, 2017, which claims priority to Chinese Patent Application No. 201611096716.1, filed on Dec. 2, 2016, The disclosures of the aforementioned applications are hereby incorporated by reference in their entireties.

TECHNICAL FIELD

The present invention relates to the field of communications technologies, and in particular, to a protection switching method and system, and a network device.

BACKGROUND

The flexible Ethernet (FlexE) is an improved network that is based on the Ethernet.

FIG. 1 shows an example of a FlexE network architecture. A plurality of links are established between a first network device 11 and a second network device 12. These links constitute a FlexE link group, and these links are used to carry at least one client service. Because one client service may be transmitted over a plurality of links, flexibility is higher.

In current FlexE standards, no related protection switching mechanism is defined. If a link is faulty in a FlexE link group, the entire FlexE link group stops working, and this may cause service interruptions in a large area.

An existing protection switching mechanism in the Ethernet is as follows: A dedicated protection link is pre-configured, and the protection link is used to: when another link is faulty, switch service data, transmitted over the faulty link, to a protection link for transmission, to prevent a service interruption.

If the protection switching mechanism in the Ethernet in the prior art is applied to the FlexE and a link in a FlexE link group is specified as a dedicated protection link, when another link than the protection link in the FlexE link group is faulty and a client service transmitted over the faulty link is switched to the protection link for transmission. Although a problem that the faulty link causes the entire FlexE link group to stop working can be prevented, a dedicated protection link needs to be specified, the protection link occupies a bandwidth resource, no client service needs to be transmitted over the protection link when no link is faulty, and the protection link is in an idle state, causing a bandwidth resource waste.

SUMMARY

Embodiments of the present invention provide a protection switching method and system, and a network device, to resolve a problem that service protection switching cannot be performed in the FlexE.

According to one aspect, an embodiment of the present invention provides a protection switching method. The method includes: if n links carrying a client service are unavailable in a FlexE link group, selecting, by a first network device from other links than the n links in the FlexE link group, at least one link as a protection link, where a bandwidth provided by the protection link is greater than or equal to a bandwidth of the client service, the FlexE link group includes a plurality of links that are logically bound, and n is a positive integer; sending, by the first network device, a calendar request to a second network device over the protection link; after receiving the calendar request, sending, by the second network device, a calendar acknowledge to the first network device over the protection link; and after receiving the calendar acknowledge, switching, by the first network device, the client service, transmitted over the n links, to the protection link for transmission.

In the solution provided in this embodiment of the present invention, when the n links are unavailable in the FlexE link group, the at least one link is selected from the other links than the n links in the FlexE link group as a protection link, and data of the client service transmitted over the n links is switched to the protection link for transmission, so that a problem that one faulty link causes the entire FlexE link group to stop working can be prevented, and an application requirement of the FlexE for protection switching is satisfied; in addition, because a dedicated link does not need to be reserved in the FlexE link group to serve as the protection link, use of a manner of selecting the protection link as required can effectively avoid a resource waste, thereby saving a bandwidth resource.

In a possible design, after the selecting, by a first network device, at least one link as a protection link, the method further includes: if p first slots that have already been assigned to the client service exist on the n links, selecting, by the first network device, p second slots from available slots of the protection link, and assigning the p second slots to the client service, where the p second slots are used to transmit the client service, and p is a positive integer. Correspondingly, the calendar request carries an identifier of the client service switched to the protection link and identifiers of the second slots.

Slot management and switching in the FlexE link group are implemented in the foregoing manner.

In another possible design, the method further includes: determining, by the first network device, to change a link in the FlexE link group, where the changing a link in the FlexE link group includes deleting and/or adding the link in the FlexE link group; sending, by the first network device, a change request to the second network device over each link in the FlexE link group after the change; after receiving the change request, sending, by the second network device, a change acknowledge to the first network device over each link in the FlexE link group after the change; and when the first network device receives the change acknowledge sent by the second network device over each link in the FlexE link group after the change, determining, by the first network device, that the change of the link in the FlexE link group succeeds.

The changing a link in the FlexE link group, including the deleting and adding the link in the FlexE link group, is implemented in the foregoing manner without intervention of a network management system or an administrator, implementing an automated link change.

In still another possible design, after the receiving, by the second network device, the change request, the method further includes: detecting, by the second network device, whether the change request satisfies a preset condition; and if the change request satisfies the preset condition, performing, by the second network device, the step of sending a change acknowledge to the first network device over each link in the FlexE link group after the change.

The change request is checked in the foregoing manner, ensuring accuracy of the link change.

In still another possible design, the change request is a FlexE information frame that carries a request identifier, and the change acknowledge is a FlexE information frame that carries an acknowledge identifier.

A field in the FlexE information frame is extended in the foregoing manner. The extended field carries the request identifier to designate the change request, or the extended field carries the acknowledge identifier to designate the change acknowledge.

According to another aspect, an embodiment of the present invention provides a link management method. The method includes: determining, by a first network device, to change a link in a FlexE link group, where the changing a link in a FlexE link group includes deleting and/or adding the link in the FlexE link group; sending, by the first network device, a change request to a second network device over each link in the FlexE link group after the change; after receiving the change request, sending, by the second network device, a change acknowledge to the first network device over each link in the FlexE link group after the change; and when the first network device receives the change acknowledge sent by the second network device over each link in the FlexE link group after the change, determining, by the first network device, that the change of the link in the FlexE link group succeeds.

In the solution provided in this embodiment of the present invention, the changing a link in the FlexE link group, including the deleting and adding the link in the FlexE link group, is implemented without intervention of a network management system or an administrator, implementing an automated link change.

According to still another aspect, an embodiment of the present invention provides a network device. The network device has a function of implementing actions of a first network device side or a second network device side in the foregoing method examples. The function may be implemented by hardware, or may be implemented by hardware executing corresponding software. The hardware or software includes one or more modules corresponding to the foregoing function.

In a possible design, a structure of the network device includes a processor and a communications interface. The processor is configured to support the network device in executing a corresponding function in the foregoing method. The communications interface is configured to support communication between the network device and another network device. Further, the network device may further include a memory. The memory is configured to couple to the processor, and stores a necessary program instruction and necessary data of the network device.

According to yet another aspect, an embodiment of the present invention provides a protection switching system. The system includes the first network device and the second network device according to the foregoing aspects.

According to yet another aspect, an embodiment of the present invention provides a computer storage medium, configured to store a computer software instruction used by the foregoing first network device and/or the foregoing second network device, and including a program designed to implement the foregoing aspects.

DESCRIPTION OF EMBODIMENTS

To make the objectives, technical solutions, and advantages of the present invention clearer, the following further describes the embodiments of the present invention in detail with reference to the accompanying drawings.

Network architectures and service scenarios described in the embodiments of the present invention aim to describe the technical solutions in the embodiments of the present invention more clearly, but are not intended to limit the technical solutions provided in the embodiments of the present invention. A person of ordinary skill in the art may know that, as the network architectures evolve and a new service scenario emerges, the technical solutions provided in the embodiments of the present invention are also applicable to a similar technical problem.

Figure 1:
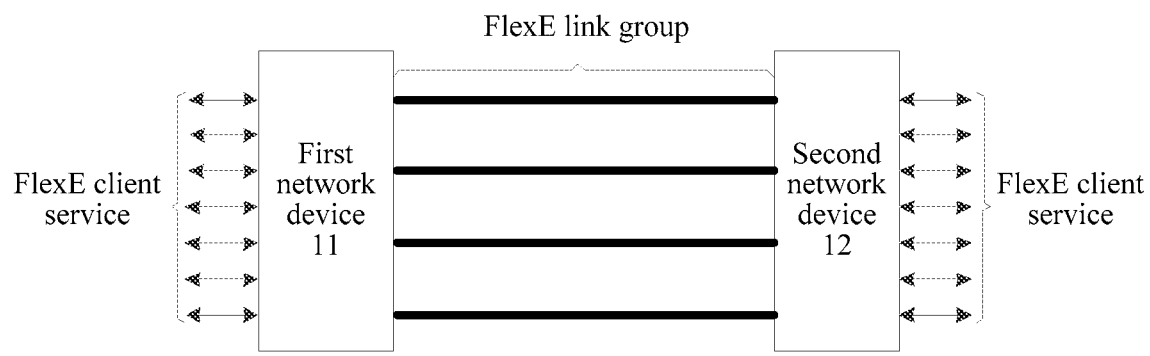
FIG. 1 shows an example of a FlexE network architecture.

The technical solutions provided in the embodiments of the present invention may be applicable to a FlexE network architecture shown in FIG. 1. The network architecture includes: a first network device 11 and a second network device 12.

A network device (for example, the first network device 11 or the second network device 12) may be a device having a data receiving and sending function, for example, a router or a switch.

There is at least one FlexE link group between the first network device 11 and the second network device 12, and each FlexE link group includes a plurality of links that are logically bound. There may be no physical connection relationship in the logical binding. Therefore, the plurality of links in the FlexE link group may be physically independent. The link in this embodiment of the present invention may be a physical Ethernet link, for example, an optical fiber. In the embodiments of the present invention, a bandwidth provided by each link is not limited. For example, the bandwidth provided by each link is 100 G. A network device in the FlexE may identify, by using serial numbers of links, links that are included in a FlexE link group, to implement logical binding of a plurality of links. For example, a serial number of each link may be identified by using a number from 1 to 254, and 0 and 255 are reserved numbers. A serial number of one link may correspond to one port on the network device. A same link needs to be identified by using a same serial number at two ends, namely, the first network device 11 and the second network device 12. Serial numbers of links included in one FlexE link group are not necessarily consecutive. Usually, there is one FlexE link group between two network devices. However, the embodiments of the present invention are not limited thereto, and there may be a plurality of FlexE link groups between two network devices. One link may be used to carry at least one client service, and one client service may be transmitted over at least one link. In FlexE standards, the client service may be referred to as a client.

Figure 2:
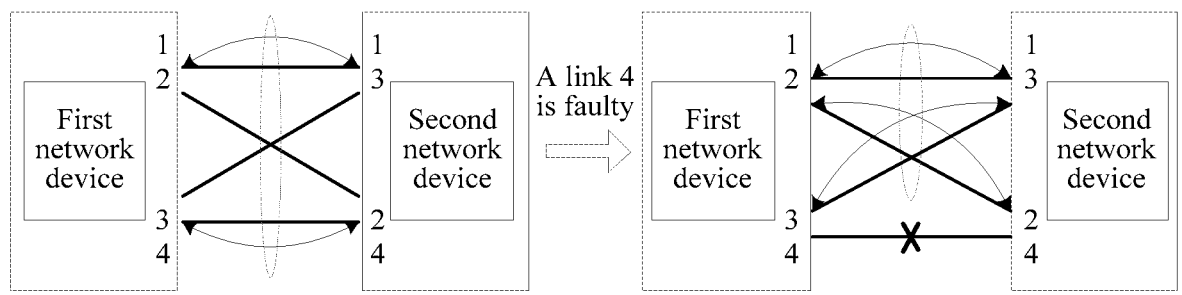
FIG. 2 is an example of a schematic diagram of protection switching.

In an example, as shown in FIG. 2, it is assumed that, there are four links: a link 1, a link 2, a link 3, and a link 4, between the first network device and the second network device, and the four links are logically bound to constitute a FlexE link group. Assuming that a bandwidth of each link in the FlexE link group is 100 G, a FlexE link group whose bandwidth is 400 G may be divided into 80 5-G slots based on a slot granularity of 5 G. Optionally, the division may be performed based on another slot granularity, and this is not limited in the present invention. A bandwidth of a client service is 20 G. The 20 G bandwidth is divided into four 5-G bandwidths, and the four 5-G bandwidths are transmitted by using four slots. Two slots thereof are assigned to the link 1, and the other two slots are assigned to the link 4. The technical solutions provided in the embodiments of the present invention are used. Assuming that the link 4 is unavailable due to a fault, because two slots on the link 4 carry client services, slots may be selected from other links that are not faulty to replace the two slots. For example, the two slots are replaced with one slot on the link 2 and one slot on the link 3, thereby implementing protection switching. If a plurality of client services are carried on the link 4, the protection switching needs to be provided to each of the plurality of client services.

The following further describes the embodiments of the present invention in detail based on common aspects of the embodiments of the present invention.

Figure 3:
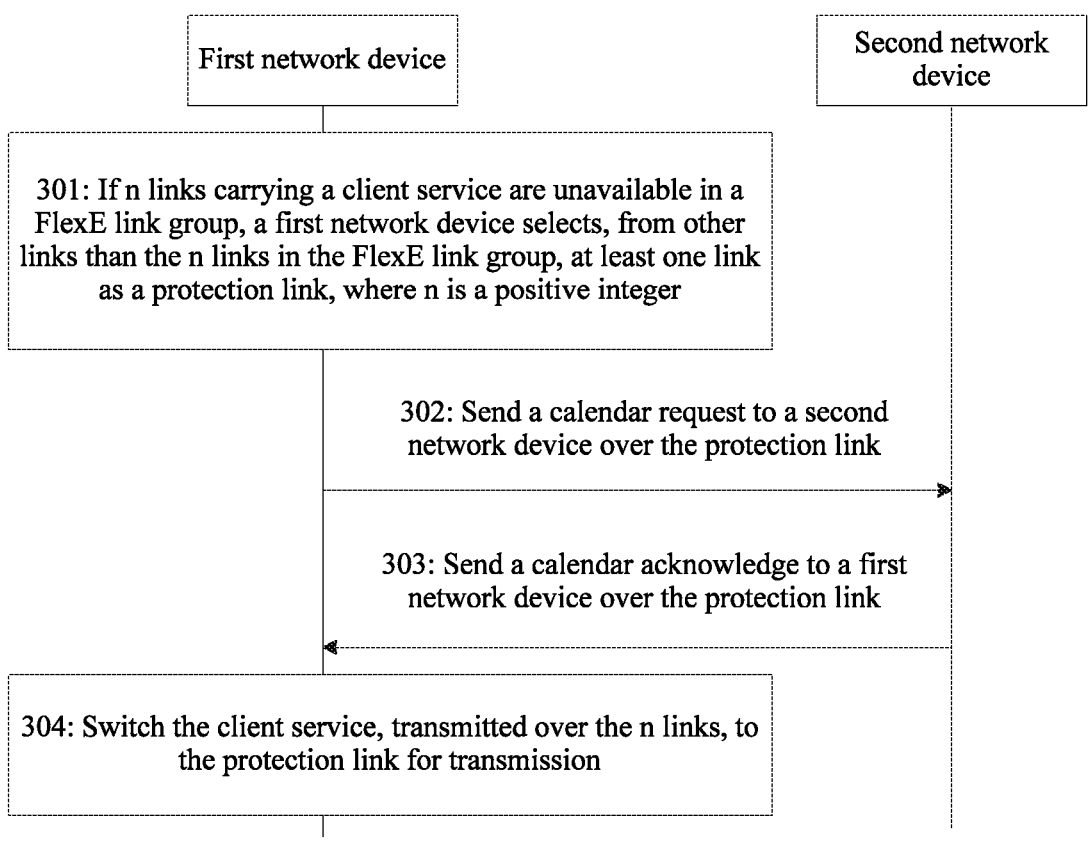
FIG. 3 is a flowchart of a protection switching method according to an embodiment of the present invention.

FIG. 3 is a flowchart of a protection switching method according to an embodiment of the present invention. The method may include the following several steps.

Step 301: If n links carrying a client service are unavailable in a FlexE link group, a first network device selects, from other links than the n links in the FlexE link group, at least one link as a protection link, where n is a positive integer.

In this embodiment of the present invention, when the n links carrying the client service are unavailable, the client service carried on the n links needs to be switched to the protection link. The n links may carry one client service, or may carry a plurality of client services. When the n unavailable links carry the plurality of client services, the plurality of client services may be all switched to the protection link. At least one link may be selected, as the protection link, from available links in the FlexE link group, without a need to use a pre-specified dedicated link as the protection link. The available link may be a link in a formal working state, or a link that is not faulty. A bandwidth provided by the selected protection link is greater than or equal to a bandwidth of the client service carried on the n unavailable links. The bandwidth provided by the selected protection link is an available bandwidth of the selected protection link. The available bandwidth may be a bandwidth that is on a link with no fault and that may be used by a to-be-switched client service.

The FlexE link group includes a plurality of links that are logically bound. In an example, it is assumed that the FlexE link group includes m links that are logically bound, and m is an integer greater than 1. When the n links carrying the client service are unavailable in the FlexE link group, the first network device selects the at least one link as the protection link, from other m-n links than the n links in the FlexE link group. When selecting the protection link, the first network device not only needs to ensure that the selected link is in an available state, but also needs to ensure that an enough bandwidth can be provided on the selected link to carry the client service.

With reference to FIG. 2, the FlexE link group includes four links, and the four links are a link 1, a link 2, a link 3, and a link 4. It is assumed that, when the link 4 is unavailable due to a fault, the first network device may select at least one link, as the protection link, from the link 1, the link 2, and the link 3.

In addition, a situation causing the link to be unavailable may be that the link is faulty. Certainly, other possible situation(s) causing the link to be unavailable is also contemplated and thus this embodiment is not intended to limit how a link may be unavailable. For example, during a test or maintenance process, the link is configured to be switched from the available state to an unavailable state.

Optionally, if p first slots that have already been assigned to the client service exist on the n unavailable links, slot switching needs to be performed, to select q second slots from available slots of the protection link, and assign the q second slots to the client service. The q second slots are used to transmit the client service, where p and q are positive integers. A bandwidth of a client service that can be carried on the q second slots is greater than or equal to a bandwidth of a client service that can be carried on the p first slots.

Usually, a bandwidth of a client service that can be carried on each slot on each link included in a same FlexE link group may be the same, for example, may be 5 G. Therefore, if the p first slots that have already been assigned to the client service exist on the n unavailable links, the slot switching needs to be performed, to select p second slots from the available slots of the protection link, and assign the p second slots to the client service. The p second slots are used to transmit the client service, where p is a positive integer. With reference to FIG. 2, assuming that two slots that have already been assigned to the client service exist on the unavailable link 4, two slots are selected from the available slots of the protection link and assigned to the client service. In this example, p is equal to q.

In this embodiment of the present invention, for a client service, if all slots occupied by the client service are assigned to the n unavailable links, the first network device switches all the slots of the client service to the protection link. If a part of slots occupied by the client service are assigned to the n unavailable links, the first network device needs to switch only the part of slots of the client service to the protection link, and does not need to switch those slots of the client service that are assigned to an available link.

In an example, for a client service, it is assumed that the client service occupies a slots, and the a slots are assigned to i links in the FlexE link group. When the n links are unavailable in the FlexE link group, the client service occupies j links of the n unavailable links. If a quantity of slots occupied on the j links by the client service is b, the first network device selects b slots from the available slots of the selected protection link, and assigns the b slots to the service. The b slots may be on a same protection link, or may be on a plurality of different protection links; $a \geq b \geq 1$, $i \geq j \geq 1$, and a, b, i, and j are all integers.

Step 302: The first network device sends a calendar request to a second network device over the protection link.

The calendar request is used to request to negotiate on switching the client service, transmitted over the n links, to the protection link for transmission. The calendar request carries an identifier of the client service switched to the protection link and identifiers of the second slots. Identifiers of client services are used to distinguish different client services, and the different client services have different identifiers. In FlexE standards, an identifier of a client service is referred to as a client ID (a client identifier). Identifiers of slots are used to distinguish different slots, and the different slots have different identifiers. To designate, in the calendar request, which second slot is assigned to which client service, an identifier of a client service to which a second slot is assigned may be filled in a representation field corresponding to the second slot.

Optionally, the first network device sends the calendar request to the second network device over each protection link. Using a target protection link as an example, a calendar request sent over the target protection link carries identifiers of client services switched to the target protection link, and identifiers of second slots that are selected from available slots of the target protection link and that are assigned to the client services. For example, assuming that a client service switched to the target protection link is a client 1, and an identifier of a second slot that is selected from the available slots of the target protection link and that is assigned to the client 1 is a slot x, the calendar request sent over the target protection link carries the client 1 and the slot x. For example, the client 1 is filled in a representation field corresponding to the slot x, to designate that the slot x is assigned to the client 1. For another example, assuming that a client service switched to the target protection link includes a client 1 and a client 2, an identifier of a second slot that is selected from the available slots of the target protection link and that is assigned to the client 1 is a slot x, and an identifier of a second slot that is selected from the available slots of the target protection link and that is assigned to the client 2 is a slot y, the calendar request sent over the target protection link carries a correspondence between the client 1 and the slot x and a correspondence between the client 2 and the slot y. For example, the client 1 is filled in a representation field corresponding to the slot x, to designate that the slot x is assigned to the client 1, and the client 2 is filled in a representation field corresponding to the slot y, to designate that the slot y is assigned to the client 2.

Step 303: The second network device sends a calendar acknowledge to the first network device over the protection link.

The calendar acknowledge is used to indicate that the second network device agrees with the calendar request.

Optionally, when the first network device sends the calendar request to the second network device over each protection link, for the target protection link, if the second network device agrees with the calendar request sent by the first network device over the target protection link, the second network device sends the calendar acknowledge to the first network device over the target protection link. The calendar acknowledge is used to indicate that the second network device agrees with the calendar request sent by the first network device over the target protection link.

Step 304: The first network device switches the client service, transmitted over the n links, to the protection link for transmission.

If the p first slots that have already been assigned to the client service exist on the n links, the first network device selects the p second slots from available slots of the protection link, assigns the p second slots to the client service, and then transmits the client service by using the p second slots. Using the target protection link as an example, the first network device selects second slots, assigned to client services, from the available slots of the target protection link, and then transmits the corresponding client services by using the second slots.

Optionally, when the first network device receives a calendar acknowledge on each protection link over which a calendar request is sent, the first network device determines that negotiation succeeds. If the first network device does not receive a calendar acknowledge on any protection link over which a calendar request is sent, the first network device determines that negotiation fails. When determining that the negotiation fails, the first network device may return to step 301, to initiate a negotiation procedure again.

Optionally, for each protection link, before receiving a calendar acknowledge sent by the second network device over the protection link, the first network device repeatedly sends a calendar request to the second network device over the protection link for a plurality of times, to ensure that the second network device successfully receives the calendar request.

In the solution provided in this embodiment of the present invention, when the n links are unavailable in the FlexE link group, the at least one link is selected from the other links than the n links in the FlexE link group as the protection link, and data of the client service transmitted over the n links is switched to the protection link for transmission, so that a problem that one faulty link causes the entire FlexE link group to stop working can be prevented, and an application requirement of the FlexE for protection switching is satisfied; in addition, because a dedicated link does not need to be reserved in the FlexE link group to serve as the protection link, use of a manner of selecting the protection link as required can effectively avoid a resource waste, thereby saving a bandwidth resource.

Figure 4:
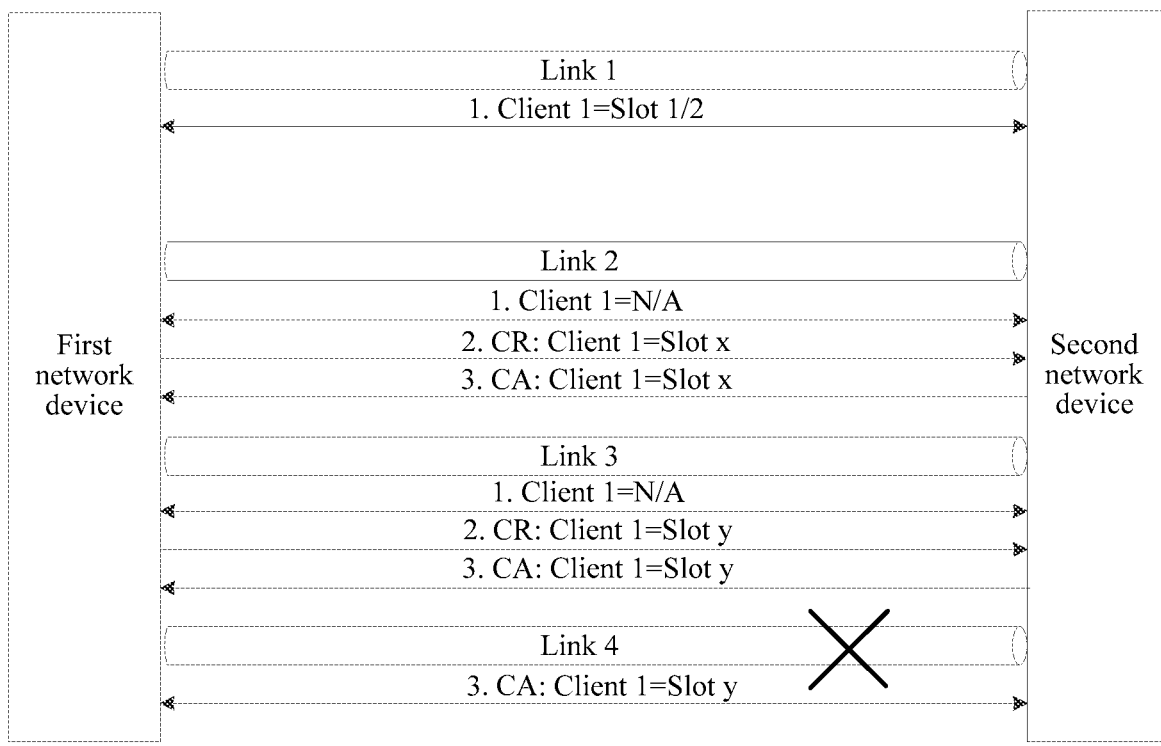
FIG. 4 is an example of a schematic diagram of slot management and switching in a FlexE link group.

In an example, FIG. 4 is an example of a schematic diagram of slot management and switching in a FlexE link group. It is assumed that, there are four links: a link 1, a link 2, a link 3, and a link 4, between a first network device and a second network device, and the four links are logically bound to constitute a FlexE link group.

In a normal running state, two slots (named slots 1/2) on the link 1 are assigned to a client service (named a client 1), two slots (named slots 1/2) on the link 4 are assigned to the client 1, and no slot on the link 2 and the link 3 is assigned to the client 1.

When the first network device detects that the link 4 is unavailable due to a fault, the first network device selects at least one link, as the protection link, from the link 1, the link 2, and the link 3. For example, the first network device selects the link 2 and the link 3 as the protection links.

The first network device sends a calendar request (CR) to the second network device over the link 2. The calendar request is used to request to negotiate on assigning, on the link 2, a slot (named a slot x) to the client 1. The calendar request carries a correspondence between the client 1 and the slot x. For example, the client 1 is filled in a representation field corresponding to the slot x, to designate that the slot x is assigned to the client 1.

After the second network device receives the calendar request sent by the first network device over the link 2, if agreeing with the calendar request, the second network device sends a calendar acknowledge (CA) to the first network device over the link 2. The calendar acknowledge may carry the correspondence between the client 1 and the slot x. For example, the client 1 is filled in the representation field corresponding to the slot x, to designate that it is determined that the slot x is assigned to the client 1. Alternatively, the calendar acknowledge may carry indication information, such as an indicator, used to indicate that the calendar request is agreed with.

The first network device sends a calendar request to the second network device over the link 3. The calendar request is used to request to negotiate on assigning, on the link 3, a slot (named a slot y) to the client 1. The calendar request carries a correspondence between the client 1 and the slot y. For example, the client 1 is filled in a representation field corresponding to the slot y, to designate that the slot y is assigned to the client 1.

After the second network device receives the calendar request sent by the first network device over the link 3, if agreeing with the calendar request, the second network device sends a calendar acknowledge to the first network device over the link 3. The calendar acknowledge may carry the correspondence between the client 1 and the slot y. For example, the client 1 is filled in the representation field corresponding to the slot y, to designate that it is determined that the slot y is assigned to the client 1. Alternatively, the calendar acknowledge may carry indication information, such as an indicator, used to indicate that the calendar request is agreed with.

The first network device transmits the client 1 by using the slot x on the link 2 and the slot y on the link 3.

Figure 5:
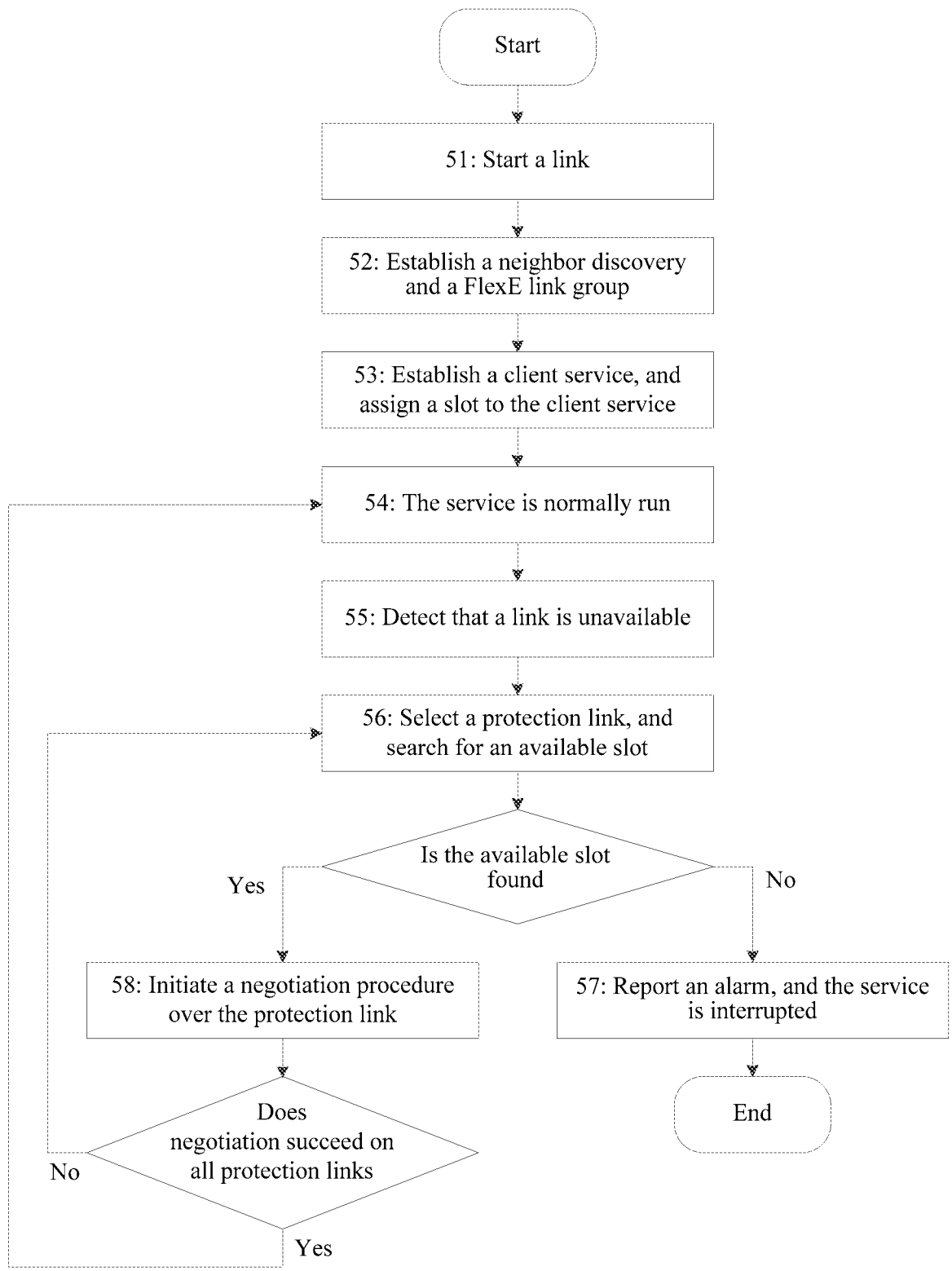
FIG. 5 is an example of a sequence diagram of slot management and switching in a FlexE link group.

Based on the embodiment shown in FIG. 3, FIG. 5 is an example of a sequence diagram of slot management and switching in a FlexE link group.

Part 51: Start a link.

Part 52: Establish a neighbor discovery and a FlexE link group.

A neighbor discovery process is used to search for another network device, to establish a FlexE link group to the another network device. The neighbor discovery may have the following several possible implementations:

1. An existing Institute of Electrical and Electronics Engineers (IEEE) protocol is used, for example, the Link Layer Discovery Protocol (LLDP), or extension is performed based on an existing protocol.

2. The protocol in the foregoing first possible implementation is used, but the protocol is run on Overhead or a management channel of the FlexE.

3. A new neighbor discovery protocol is defined based on the management channel of the FlexE.

The foregoing second and third possible implementations are more suitable for some network devices that have only a FlexE function but do not have an upper layer protocol function. For example, a network device does not have a Media Access Control (MAC) layer or an Internet Protocol (IP) layer, and has only a forwarding function of the FlexE.

A process of establishing the FlexE link group may have the following several implementations:

1. The FlexE link group is configured by a network administrator or manually established by the network administrator by using a command line.

2. Extension is performed based on the existing IEEE protocol. For example, the Link Aggregation Control Protocol (LACP) is extended.

3. The protocol in the foregoing second possible implementation is used, but the protocol is run on the Overhead or management channel of the FlexE.

4. A new protocol is defined based on the Overhead or management channel of the FlexE, to implement automated management and configuration of the FlexE link group.

The foregoing third and fourth implementations are more applicable to some network devices that have only the FlexE function but do not have the upper layer protocol function. For example, a network device does not have the MAC layer or the IP layer, and has only the forwarding function of the FlexE.

Optionally, during the process of establishing the FlexE link group, devices at two ends may negotiate to determine an active (active) end and a passive (passive) end. The calendar request is initiated by the active end. In this way, it can be avoided that the devices at the two ends simultaneously initiate the calendar request, consequently causing selected protection links and/or slots to be different. This helps simplify the negotiation procedure.

Part 53: Establish a client service, and assign a slot to the client service.

Part 54: The service is normally run.

Part 55: Detect that a link carrying the client service is unavailable in the FlexE link group.

Part 56: Select a protection link from other available links, and search for an available slot.

Part 57: If no available slot is found, report, to a network management system, alarm information used to indicate that no available slot is found, and the service is interrupted.

Part 58: If an available slot is found, initiate a negotiation procedure over the protection link.

If negotiation succeeds on all protection links, the service is normally run. If negotiation fails on any protection link, return to part 56.

Figure 6:
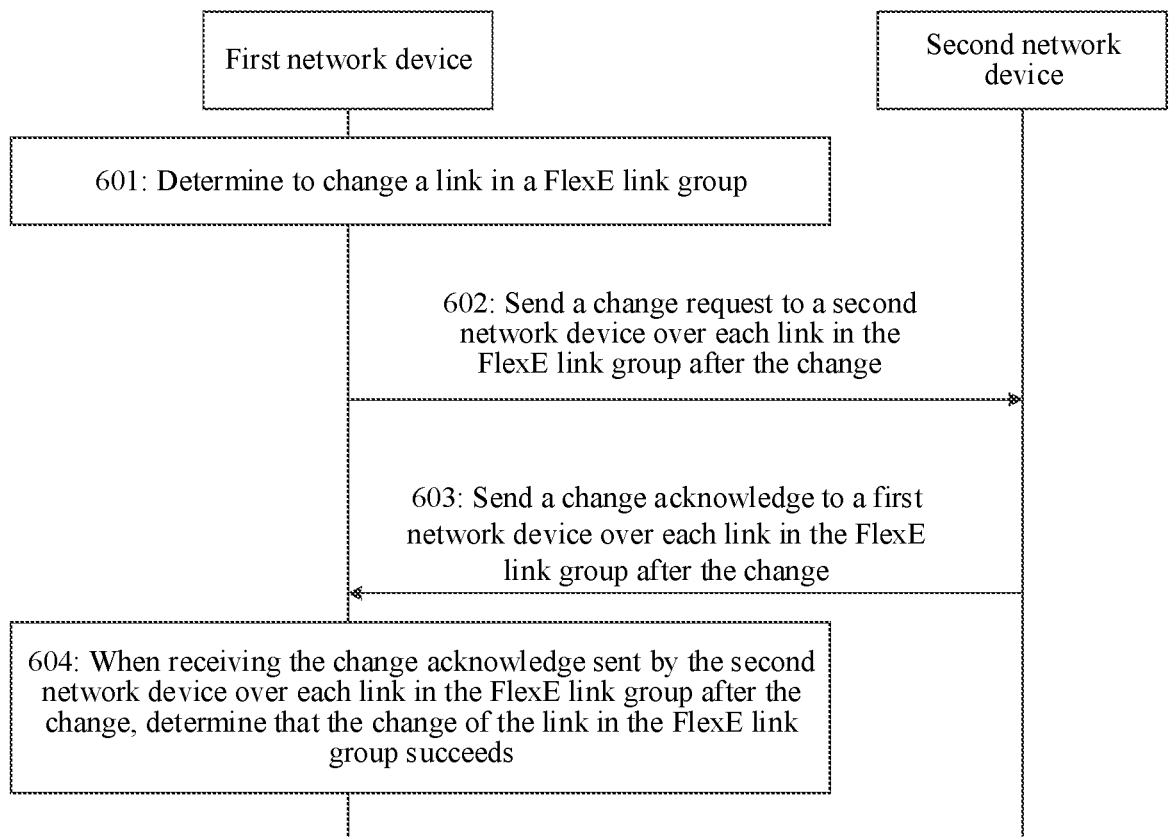
FIG. 6 is a flowchart of a link management method according to an embodiment of the present invention.

FIG. 6 is a flowchart of a link management method according to an embodiment of the present invention. The method may include the following several steps.

Step 601: A first network device determines to change a link in a FlexE link group.

The changing a link in a FlexE link group includes deleting and/or adding the link in the FlexE link group.

In this embodiment of the present invention, a condition under which the first network device determines to delete the link in the FlexE link group is not limited. For example, when a target link in the FlexE link group is unavailable (for example, faulty), the first network device determines to delete the target link.

In this embodiment of the present invention, a condition under which the first network device determines to add a link to the FlexE link group is not limited. For example, when an available link in the FlexE link group is not sufficient, the first network device determines to add a link to the FlexE link group.

Figure 7:
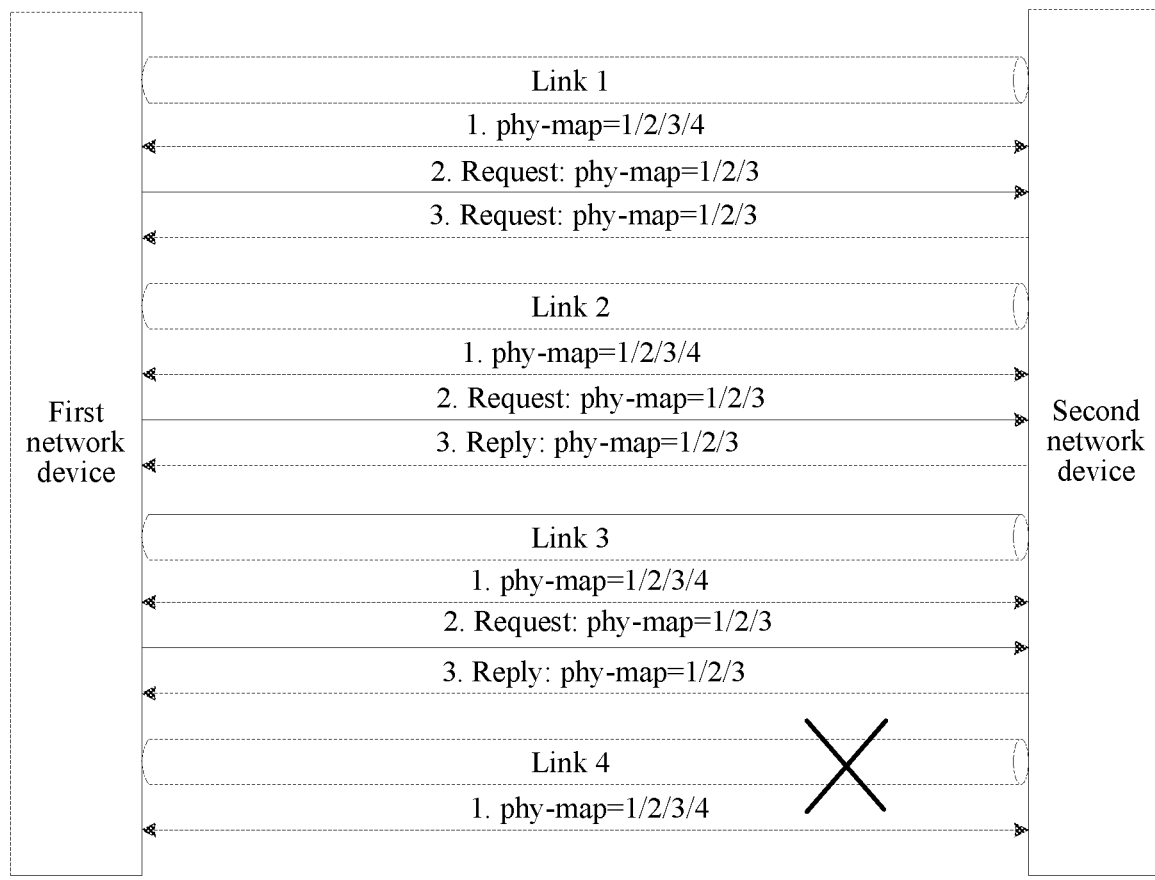
FIG. 7 is an example of a schematic diagram of deleting a link from a FlexE link group.

In an example, FIG. 7 is an example of a schematic diagram of deleting a link from a FlexE link group. It is assumed that, there are four links: a link 1, a link 2, a link 3, and a link 4, between the first network device and a second network device, and the four links are logically bound to constitute a FlexE link group. A packet transmitted over a link by devices at two ends may be referred to as a FlexE information frame, and the FlexE information frame may be a FlexE overhead frame or a FlexE management frame. In FlexE standards, the FlexE information frame is referred to as a FlexE overhead frame or a FlexE multiframe. In a packet header of the FlexE information frame, a link included in the FlexE link group is indicated by using phy-map information. For example, the phy-map information carries identifiers of all links included in the FlexE link group. The phy-map information is bidirectionally sent over all the links included in the FlexE link group. The phy-map information in combination with some other information (such as calendar information) can designate a slot/slots serving a client service and help perform encoding, decoding, and transmission of service data. The calendar information may be referred to as a slot assignment table, and is used to indicate an assignment relationship between a slot and a client service. The phy-map information in combination with some other information (such as phy-number information) can provide a check function, ensuring that the devices at the two ends of the FlexE link group have a same configuration in terms of composition of the FlexE link group. The phy-number information is an identifier of the FlexE link group.

As shown in FIG. 7, when the FlexE link group includes the four links, phy-map information transmitted over each link carries identifiers of the four links, and the FlexE link group is named phy-map=1/2/3/4. When the link 4 is unavailable due to a fault, the first network device determines to delete the link 4 from the FlexE link group.

Step 602: The first network device sends a change request to the second network device over each link in the FlexE link group after the change.

The change request is used to request the second network device to change the link in the FlexE link group. Optionally, the change request carries an identifier of each link in the FlexE link group after the change.

Still using the foregoing example as an example, after determining to delete the link 4, the first network device separately sends a change request to the second network device over the link 1, the link 2, and the link 3. The change request carries identifiers of the link 1, the link 2, and the link 3.

Step 603: The second network device sends a change acknowledge to the first network device over each link in the FlexE link group after the change.

After receiving the change request, if agreeing with the change request, the second network device sends the change acknowledge to the first network device. The change acknowledge is used to indicate that the second network device agrees with the change request.

Optionally, before sending the change acknowledge to the first network device, the second network device checks the change request, and performs step 603 if the check succeeds. In a possible implementation, the second network device detects whether the change request satisfies a preset condition. If the change request satisfies the preset condition, the second network device performs step 603. The preset condition includes at least one of the following: Each change request indicates a same link included in the FlexE link group after a change; a quantity, indicated by each change request, of links included in the FlexE link group after the change is the same as a quantity, determined by the second network device, of links included in the FlexE link group after the change; and each link in the FlexE link group after the change has a same identifier on the first network device and the second network device.

In addition, to prevent an error from occurring in the check performed by the second network device on the change request, it needs to be ensured that the change request sent by the first network device over each link arrives at the second network device within a relatively short time interval. For example, the first network device simultaneously sends the change request over each link.

Step 604: When the first network device receives the change acknowledge sent by the second network device over each link in the FlexE link group after the change, the first network device determines that the change of the link in the FlexE link group succeeds.

After determining that the change of the link in the FlexE link group succeeds, the first network device may add the client service to the FlexE link group after the change.

If the first network device does not receive the change acknowledge on some or all links in the FlexE link group after the change, the first network device determines that the change of the link in the FlexE link group fails. When determining that the change fails, the first network device may send, to a network management system, alarm information used to indicate that the change fails.

Optionally, the change request is a FlexE information frame that carries a request identifier, and the change acknowledge is a FlexE information frame that carries an acknowledge identifier. In a possible implementation, a field in the FlexE information frame may be extended, and the extended field may carry the request identifier or the acknowledge identifier. For example, based on existing FlexE Overhead, a phy-map change request (PCR) field and a phy-map change acknowledge (PCA) field are added. A value of a PCR field may be 0 or 1. For example, when the value of the PCR field is 0, it indicates that no request identifier is carried. When the value of the PCR field is 1, it indicates that the request identifier is carried. A value of the PCA field may be 0 or 1. For example, when a value of a PCA field is 0, it indicates that no acknowledge identifier is carried. When the value of the PCA field is 1, it indicates that the acknowledge identifier is carried.

Optionally, for each link in the FlexE link group after the change, before receiving a change acknowledge sent by the second network device over the link, the first network device repeatedly sends a change request to the second network device for a plurality of times over the link, to ensure that the second network device successfully receives the change request.

It should be noted that, if the link deleted from the FlexE link group is a link with a unidirectional fault or a link without a fault, the devices at the two ends should stop sending FlexE Overhead over the deleted link, or modify a related parameter of Overhead, for example, set an identifier of a FlexE link group corresponding to the deleted link to be an invalid identifier or assign an identifier of a FlexE link group to the deleted link again, to avoid that the deleted link uses an original identifier of the FlexE link group and then confusion with the FlexE link group after the change is caused.

With reference to FIG. 7, the following describes a process of negotiation between the first network device and the second network device by using an example of deleting a link from a FlexE link group.

In a normal running state, the first network device and the second network device reach a consensus about the link included in the FlexE link group, and a FlexE information frame sent by the devices at the two ends to a peer end carries the following information: phy-map=1/2/3/4, PCR=0, PCA=0.

When the first network device detects that the link 4 is unavailable due to a fault, the first network device determines to delete the link 4 from the FlexE link group, and the first network device separately sends a change request to the second network device over the link 1, the link 2, and the link 3. The change request carries the following information: phy-map=1/2/3, PCR=1, PCA=0.

After receiving the change request sent by the first network device over the link 1, the link 2, and the link 3, the second network device checks the change request (for example, check whether phy-map information included in each change request is consistent). When the check succeeds, the second network device separately sends a change acknowledge to the first network device over the link 1, the link 2, and the link 3. The change acknowledge carries the following information: phy-map=1/2/3, PCR=0, PCA=1.

After receiving the change acknowledge sent by the second network device over the link 1, the link 2, and the link 3, the first network device determines that the link 4 in the FlexE link group is successfully deleted. Subsequently, the FlexE information frame sent by the devices at the two ends to the peer end carries the following information: phy-map=1/2/3, PCR=0, PCA=0.

In the example shown in FIG. 7, only an example of deleting one link from the FlexE link group through one time of negotiation is used. During actual application, a plurality of links may alternatively be deleted from the FlexE link group through one time of negotiation. In addition, in the example shown in FIG. 7, only a negotiation procedure for deleting the link from the FlexE link group is used as an example. A negotiation procedure for adding a link to the FlexE link group is similar to the negotiation procedure for deleting the link from the FlexE link group. Details are not described again in this embodiment of the present invention.

In addition, the negotiation procedure is also applicable to an initial establishment process for a FlexE link group. After a neighbor discovery, the devices at the two ends obtain an identifier of the Flex link group through negotiation, for all links between the two to use. In a possible implementation, one end of the devices at the two ends generates the identifier of the Flex link group, and notifies the other end of the identifier of the Flex link group. In another possible implementation, the devices at the two ends each generate an identifier of a same Flex link group based on a preset algorithm. For example, the preset algorithm is performing a hash operation by using MAC addresses or other parameters as an input. After the identifier of the Flex link group is determined through negotiation, it may be considered that the Flex link group has been established. In this case, a quantity of links included in the Flex link group is zero. Subsequently, the devices at the two ends may add a link to the FlexE link group by using the negotiation procedure described above.

In the solution provided in this embodiment of the present invention, the changing a link in the FlexE link group, including the deleting and adding the link in the FlexE link group, is implemented without intervention of a network management system or an administrator, implementing an automated link change.

Figure 8:
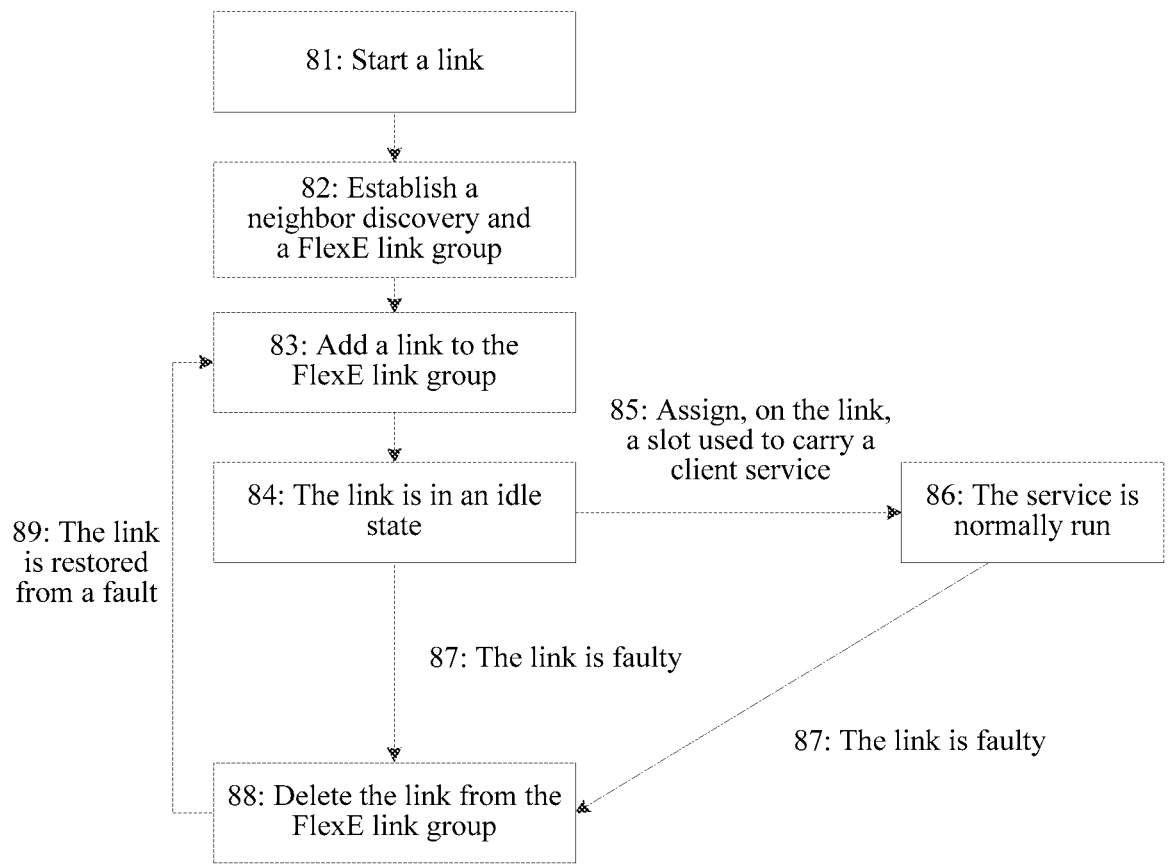
FIG. 8 is an example of a sequence diagram of deleting a faulty link in a FlexE link group.

Based on the embodiment shown in FIG. 6, FIG. 8 is an example of a sequence diagram of deleting a faulty link from a FlexE link group.

Part 81: Start a link.

Part 82: Establish a neighbor discovery and a FlexE link group.

For the neighbor discovery process and the FlexE link group establishment process, refer to the foregoing descriptions. Details are not described herein again.

Part 83: Add a link to the FlexE link group.

Part 84: The link is in an idle state.

Part 85: Assign, on the link, a slot used to carry a client service.

Part 86: The service is normally run.

Part 87: The link is faulty.

Part 88: Delete the link from the FlexE link group.

Part 89: The link is restored from a fault.

After the link is restored from the fault, the link may be added to the FlexE link group again.

It should be noted that, the protection switching procedure is described in the embodiment shown in FIG. 3. The link management procedure is described in the embodiment shown in FIG. 6. The two procedures may be independently performed. A timing and a sequence for performing the foregoing two procedures are not limited in this embodiment of the present invention.

Figure 9:
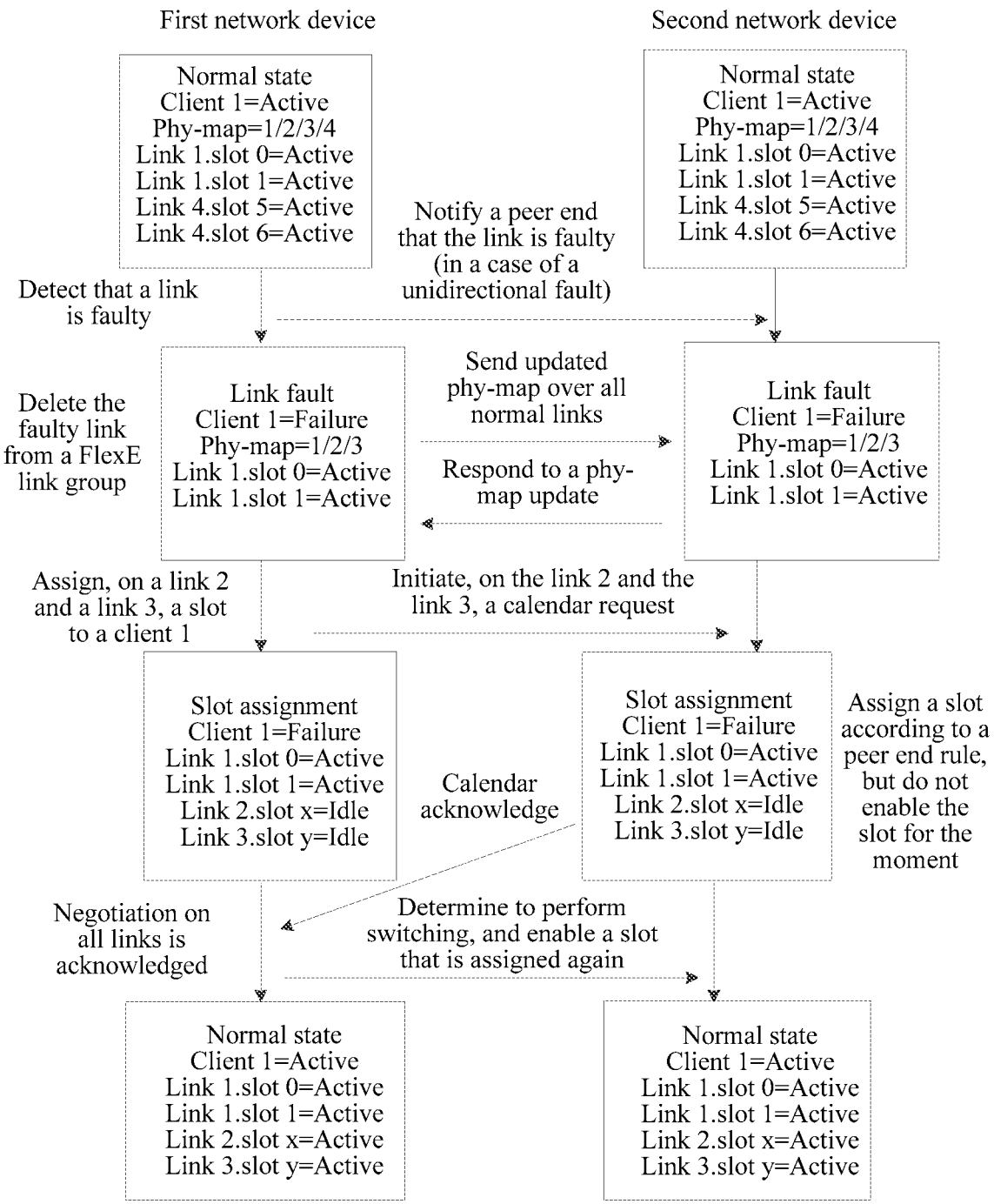
FIG. 9 is an example of a schematic diagram of a link management procedure and a protection switching procedure.

FIG. 9 is an example of a schematic diagram of a link management procedure and a protection switching procedure.

In a normal running state, a FlexE link group includes four links: a link 1, a link 2, a link 3, and a link 4. A client service client 1 is normally run, and occupies two slots (a slot 0 and a slot 1) of the link 1 and two slots (a slot 5 and a slot 6) of the link 4.

When a first network device detects that the link 4 is unavailable due to a fault, the first network device determines to delete the link 4 from the FlexE link group, and the first network device separately sends a change request to a second network device over the link 1, the link 2, and the link 3. The change request carries the following information: phy-map=1/2/3, PCR=1, PCA=0.

After receiving the change request sent by the first network device over the link 1, the link 2, and the link 3, the second network device checks the change request (for example, check whether phy-map information included in each change request is consistent). When the check succeeds, the second network device separately sends a change acknowledge to the first network device over the link 1, the link 2, and the link 3. The change acknowledge carries the following information: phy-map=1/2/3, PCR=0, PCA=1.

After receiving the change acknowledge sent by the second network device over the link 1, the link 2, and the link 3, the first network device determines that the link 4 in the FlexE link group is successfully deleted.

The first network device selects at least one link, as a protection link, from the link 1, the link 2, and the link 3. For example, the first network device selects the link 2 and the link 3 as protection links.

The first network device sends a calendar request to the second network device over the link 2. The calendar request is used to request to negotiate on assigning, on the link 2, a slot (named a slot x) to the client 1. The calendar request carries a correspondence between the client 1 and a slot x. For example, the client 1 is filled in a representation field corresponding to the slot x, to designate that the slot x is assigned to the client 1.

After the second network device receives the calendar request sent by the first network device over the link 2, if agreeing with the calendar request, the second network device sends a calendar acknowledge to the first network device over the link 2.

The first network device sends a calendar request to the second network device over the link 3. The calendar request is used to request to negotiate on assigning, on the link 3, a slot (named a slot y) to the client 1. The calendar request carries a correspondence between the client 1 and the slot y. For example, the client 1 is filled in a representation field corresponding to the slot y, to designate that the slot y is assigned to the client 1.

After the second network device receives the calendar request sent by the first network device over the link 3, if agreeing with the calendar request, the second network device sends a calendar acknowledge to the first network device over the link 3.

The first network device transmits the client 1 by using the slot x on the link 2 and the slot y on the link 3, and the client 1 is restored to the normal running state.

The foregoing mainly describes the solutions in the embodiments of the present invention from the perspective of interaction between the first network device and the second network device. It may be understood that, to implement the foregoing functions, a network device (for example, the first network device or the second network device) includes hardware structures and/or software modules corresponding to execution of the functions. With reference to examples of units, algorithms, and steps described in the embodiments disclosed in the present invention, the embodiments of the present invention can be implemented by hardware or hardware combining with computer software. Whether a function is performed by hardware or hardware driven by computer software depends on particular applications and design constraints of the technical solutions. A person skilled in the field may use different methods to implement the described functions for each particular application, but it should not be considered that the implementation falls beyond the scope of the technical solutions in the present invention.

In the embodiments of the present invention, functional units of the network device (for example, the first network device and the second network device) may be classified based on the foregoing method embodiments. For example, functional units may be classified in correspondence to functions, or two or more functions may be integrated in one processing unit. The integrated unit may be implemented in a form of hardware, or may be implemented in a form of a software functional unit. It should be noted that, in this embodiment of the present invention, unit division is exemplary, and is merely a logical function division. In actual implementation, another division manner may be used.

Figure 10A:
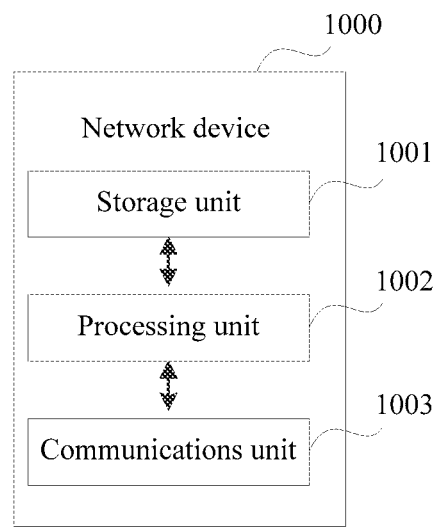
FIG. 10A is a schematic block diagram of a network device according to an embodiment of the present invention.

When an integrated unit is used, FIG. 10A is a possible schematic structural diagram of the network device provided in the foregoing embodiments. The network device 1000 includes a processing unit 1002 and a communications unit 1003. The processing unit 1002 is configured to control and manage an action of the network device 1000. For example, the processing unit 1002 is configured to support the network device 1000 in performing steps 301, 302, and 304 in FIG. 3, steps 601, 602, and 604 in FIG. 6, step 303 in FIG. 3, and step 603 in FIG. 6, and/or configured to perform another step in the technology described in this specification. The communications unit 1003 is configured to support the network device 1000 in communicating with another network device. The network device 1000 may further include a storage unit 1001, configured to store program code and data of the network device 1000.

The processing unit 1002 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 1003 may be a communications interface, a transceiver, a transceiver circuit, or the like. The communications interface is a general term, and may include one or more interfaces, for example, an interface between the first network device and the second network device. The storage unit 1001 may be a memory.

Figure 10B:
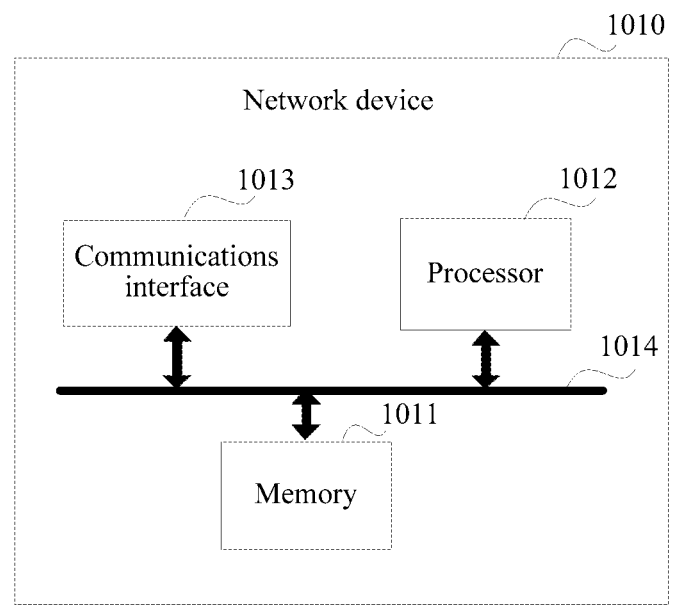
FIG. 10B is a schematic structural diagram of a network device according to an embodiment of the present invention.

When the processing unit 1002 is a processor, the communications unit 1003 is a communications interface, and the storage unit 1001 is a memory, the network device in this embodiment of the present invention may be the network device shown in FIG. 10B.

Referring to FIG. 10B, the network device 1010 includes: a processor 1012, a communications interface 1013, and a memory 1011. Optionally, the network device 1010 may further include a bus 1014. The communications interface 1013, the processor 1012, and the memory 1011 may be connected to each other by using the bus 1014. The bus 1014 may be a peripheral component interconnect (PCI) bus, an Extended Industry Standard Architecture (EISA) bus, or the like. The bus 1014 may be classified into an address bus, a data bus, a control bus, and the like. For ease of representation, only one thick line is used to represent the bus in FIG. 10B, but this does not mean that there is only one bus or only one type of bus.

The network device shown in FIG. 10A or FIG. 10B may be the first network device or the second network device.

Methods or algorithm steps described in combination with the content disclosed in this embodiment of the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in network equipment. Certainly, the processor and the storage medium may exist in the user equipment as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementation manners of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A protection switching method, wherein the method comprises:

after n links carrying a client service become unavailable in a flexible Ethernet (FlexE) link group, selecting, by a first network device, from links other than the n links in the FlexE link group, at least one link as a protection link, wherein a bandwidth provided by the protection link is greater than or equal to a bandwidth of the client service, the FlexE link group comprises a plurality of links logically bound, and n is a positive integer;

sending, by the first network device, a calendar request to a second network device over the protection link, wherein the calendar request is configured for requesting to negotiate on switching the transmission of the client service from the n links to the protection link; and receiving, by the first network device, a calendar acknowledge sent by the second network device over the protection link, and switching the transmission of the client service from the n links to the protection link.

2. The method according to claim 1, wherein after selecting the at least one link as a protection link, the method further comprises:

if p first slots that have already been assigned to the client service exist on the n links, selecting, by the first network device, p second slots from available slots of the protection link, and assigning the p second slots to the client service, wherein the p second slots are for transmitting the client service, and p is a positive integer, wherein the calendar request carries an identifier of the client service switched to the protection link and identifiers of the second slots.

3. A protection switching method, wherein the method comprises:

determining, by a first network device, to change a link in the FlexE link group, wherein changing the link in the FlexE link group comprises deleting and/or adding the link in the FlexE link group;

sending, by the first network device, a change request to a second network device over each link in the FlexE link group after the change, wherein the change request is configured to instruct to change the link in the FlexE link group; and when the first network device receives a change acknowledge sent by the second network device over each link in the FlexE link group after the change, determining, by the first network device, that the change of the link in the FlexE link group succeeds, wherein the change acknowledge indicates that the second network device agrees with the change request.

4. The method according to claim 3, wherein the change request is a FlexE information frame that carries a request identifier, and the change acknowledge is a FlexE information frame that carries an acknowledge identifier.

5. A protection switching method, wherein the method comprises:

receiving, by a second network device, a calendar request sent by a first network device over a protection link in a flexible Ethernet (FlexE) link group, wherein the protection link is at least one link selected by the first network device from links other than the n links in the FlexE link group, wherein the n links carry a client service and are unavailable, and the calendar request is configured for requesting to negotiate on switching a transmission of a client service from the n links to the protection link, wherein a bandwidth provided by the protection link is greater than or equal to a bandwidth of the client service, the FlexE link group comprises a plurality of links that are logically bound, and n is a positive integer; and sending, by the second network device, a calendar acknowledge to the first network device over the protection link, wherein the calendar acknowledge indicates that the second network device agrees with the calendar request.

6. The method according to claim 5, wherein the calendar request carries an identifier of the client service switched to the protection link and an identifier of a second slot, wherein the second slot is a slot selected by the first network device from available slots of the protection link and assigned to the client service.

7. A protection switching method, wherein the method comprises:

receiving, by a second network device, a change request sent by a first network device over each link in the FlexE link group after a change after the first network device determines to change a link in the FlexE link group, wherein the change request is configured to instruct to change the link in the FlexE link group, and changing the link in the FlexE link group comprises deleting and/or adding the link in the FlexE link group; and sending, by the second network device, a change acknowledge to the first network device over each link in the FlexE link group after the change, wherein the change acknowledge indicates that the second network device agrees with the change request.

8. The method according to claim 7, wherein after receiving, by the second network device, the change request sent by the first network device over each link in the FlexE link group, the method further comprises:

detecting, by the second network device, whether the change request satisfies a preset condition; and if the change request satisfies the preset condition, sending, by the second network device, a change acknowledge to the first network device over each link in the FlexE link group after the change.

9. The method according to claim 7, wherein the change request is a FlexE information frame that carries a request identifier, and the change acknowledge is a FlexE information frame that carries an acknowledge identifier.

10. A network device, wherein the network device is a first network device, and the network device comprises: a processor and a communications interface, wherein the processor is configured to: after n links carrying a client service become unavailable in a flexible Ethernet (FlexE) link group, select, from links other than the n links in the FlexE link group, at least one link as a protection link, wherein a bandwidth provided by the protection link is greater than or equal to a bandwidth of the client service, the FlexE link group comprises a plurality of links logically bound, and n is a positive integer;

the communications interface is configured to send a calendar request to a second network device over the protection link, wherein the calendar request is configured to request to negotiate on switching a transmission of the client service from the n links to the protection link;

the communications interface is further configured to receive a calendar acknowledge sent by the second network device over the protection link; and the processor is further configured to switch the transmission of the client service from the n links to the protection link.

11. The network device according to claim 10, wherein the processor is further configured to:
if p first slots that have already been assigned to the client service exist on the n links, select p second slots from available slots of the protection link, and assign the p second slots to the client service, wherein the p second slots are used to transmit the client service, and p is a positive integer, wherein
the calendar request carries an identifier of the client service switched to the protection link and identifiers of the second slots.

12. A network device, wherein the network device is a first network device, and the network device comprises: a processor and a communications interface, wherein
the processor is configured to determine to change a link in the FlexE link group, wherein changing the link in the FlexE link group comprises deleting and/or adding the link in the FlexE link group;
the communications interface is configured to send a change request to a second network device over each link in the FlexE link group after the change, wherein the change request is configured to instruct to change the link in the FlexE link group; and
the processor is further configured to: when receiving a change acknowledge sent by the second network device over each link in the FlexE link group after the change, determine that the change of the link in the FlexE link group succeeds, wherein the change acknowledge indicates that the second network device agrees with the change request.

13. The network device according to claim 12, wherein the change request is a FlexE information frame that carries a request identifier, and the change acknowledge is a FlexE information frame that carries an acknowledge identifier.

14. A network device, wherein the network device is a second network device, and the network device comprises a communications interface, wherein
the communications interface is configured to receive a calendar request sent by a first network device over a protection link in a flexible Ethernet (FlexE) link group, wherein the protection link is at least one link selected by the first network device from links other than the n links in the FlexE link group, wherein the n links carry a client service and are unavailable, and the calendar request is configured for requesting to negotiate on switching a transmission of the client service from the n links to the protection link, wherein a bandwidth provided by the protection link is greater than or equal to a bandwidth of the client service, the FlexE link group comprises a plurality of links that are logically bound, and n is a positive integer; and
the communications interface is further configured to send a calendar acknowledge to the first network device over the protection link, wherein the calendar acknowledge is used to indicate that the second network device agrees with the calendar request.

15. The network device according to claim 14, wherein the calendar request carries an identifier of the client service switched to the protection link and an identifier of a second slot, wherein the second slot is a slot that is selected by the first network device from available slots of the protection link and assigned to the client service.

16. A network device, wherein the network device is a second network device, and the network device comprises a communications interface configured to:
receive a change request sent by the first network device over each link in the FlexE link group after a change after the first network device determines to change a link in the FlexE link group, wherein the change request is configured to instruct to change the link in the FlexE link group, and changing the link in the FlexE link group comprises deleting and/or adding the link in the FlexE link group; and
send a change acknowledge to the first network device over each link in the FlexE link group after the change, wherein the change acknowledge indicates that the second network device agrees with the change request.

17. The network device according to claim 16, wherein the network device further comprises a processor;
the processor is configured to detect whether the change request satisfies a preset condition; and
the communications interface is further configured to: when the change request satisfies the preset condition, perform the step of sending a change acknowledge to the first network device over each link in the FlexE link group after the change.

18. The network device according to claim 16, wherein the change request is a FlexE information frame that carries a request identifier, and the change acknowledge is a FlexE information frame that carries an acknowledge identifier.

* * * * *